United States Patent
Chen

[19]

[11] Patent Number: 5,956,523
[45] Date of Patent: Sep. 21, 1999

[54] METHOD AND APPARATUS FOR REDUCING THE NUMBER OF RS232/RS485 TRANSMISSION CONVERTERS REQUIRED FOR COMMUNICATING BETWEEN A PC AND A PLURALITY OF INSTRUMENTS

[75] Inventor: Cheng-jen Chen, Sanchung, Taiwan

[73] Assignee: Advantech Co., Ltd., Taipei Hsien, Taiwan

[21] Appl. No.: 08/694,969

[22] Filed: Aug. 9, 1996

[51] Int. Cl.$^6$ ..................................................... G06F 13/00
[52] U.S. Cl. ........................ 395/882; 395/851; 395/891; 370/466
[58] Field of Search ..................... 370/492, 466, 370/467, 471, 474, 475; 375/222, 377; 395/851, 891, 882–885

[56] References Cited

U.S. PATENT DOCUMENTS

| | | | |
|---|---|---|---|
| 4,852,041 | 7/1989 | Nakano ..................................... | 395/500 |
| 4,884,287 | 11/1989 | Jones et al. ............................. | 375/377 |
| 5,214,650 | 5/1993 | Renner et al. .......................... | 370/276 |
| 5,358,202 | 10/1994 | Tse et al. ............................... | 246/34 R |
| 5,404,462 | 4/1995 | Datwyler et al. ....................... | 395/308 |
| 5,526,037 | 6/1996 | Cortjens et al. ........................ | 348/15 |

*Primary Examiner*—Meng-Ai T. An
*Assistant Examiner*—Sumati Lefkowitz
*Attorney, Agent, or Firm*—Rosenberg, Klein & Bilker

[57] ABSTRACT

A communication system and method that reduces the number of converters required for communication between a personal computer and a plurality of instruments includes a master data transmission converter coupled to the personal computer and adapted to communicate with the personal computer and a plurality of branch data transmission converters. Each of the branch data converters being coupled to the master data transmission converter through an RS485 interface and one of the instruments through an RS232 interface. Each of the branch data transmission converters having a unique individual identity address code such that only one communication path is built between the master data transmission converter and a branch data transmission converter that has been addressed by an information signal from the personal computer via the master data transmission converter. Each of the branch data transmission converters controls the direction of data flow between the RS485 interface and the RS232 interface responsive to an interrupt activated by a respective one of the RS485 or RS232 interfaces.

4 Claims, 5 Drawing Sheets

METHOD AND APPARATUS FOR REDUCING THE NUMBER OF RS232/RS485 TRANSMISSION CONVERTERS REQUIRED FOR COMMUNICATING BETWEEN A PC AND A PLURALITY OF INSTRUMENTS

BACKGROUND OF THE INVENTION

This invention relates to an apparatus connected between a personal computer (PC) and instruments, particularly to an RS-232/RS-485 data transmission converter where each can be provided with a unique identity code for facilitating the communication therebetween.

Nowadays, using a personal computer (PC) to process information from various instruments or equipment is a commonly used skill. An RS-232 standard interface has to be connected between the PC and each of the instruments so as to form a communication path. If a remote communication is required, an RS-485 standard interface will be necessary. Thus, two RS232/RS485 converters are required for converting the communication between RS232 and RS485 standards. Therefore, the complexity and the costs for interfacing the PC and the instruments have been greatly increased. Further, as transmission directions of the RS232/RS485 converters have to be controlled by the PC and cannot operate in an automatic switching mode, this is an additional burden to the PC and it will also easily cause incorrect messages to occur when operating in a multitask mode.

SUMMARY OF THE INVENTION

It is an object of the present invention to provide a data transmission converter for significantly reducing the total amount of the required converters for transmission between a PC and a plurality of instruments.

It is another object of the present invention to provide a data transmission converter for controlling a transmission direction between the PC and the instruments without having the PC to control the transmission direction therebetween.

It is yet another object of the present invention to provide a data transmission converter which can adjust its transmission rate in response to the transmission rate of each instrument.

A communication system for communicating between a personal computer and a plurality of instruments, includes a master data transmission converter means coupled to the personal computer and adapted to communicate with the personal computer and a corresponding number of branch data transmission converter means each coupled between the master data transmission converter and one of the instruments and having a unique individual identity address code such that only one communication path is built between the master data transmission converter means and a branch data transmission converter means which has been addressed by an information signal from the personal computer via the master data transmission converter means.

These and additional objects, if not set forth specifically herein, will be readily apparent to those skilled in the art from the detailed description provided herein, with appropriate reference to the accompanying drawings.

DETAILED DESCRIPTION OF THE PREFERRED EMBODIMENT

Figure 1:
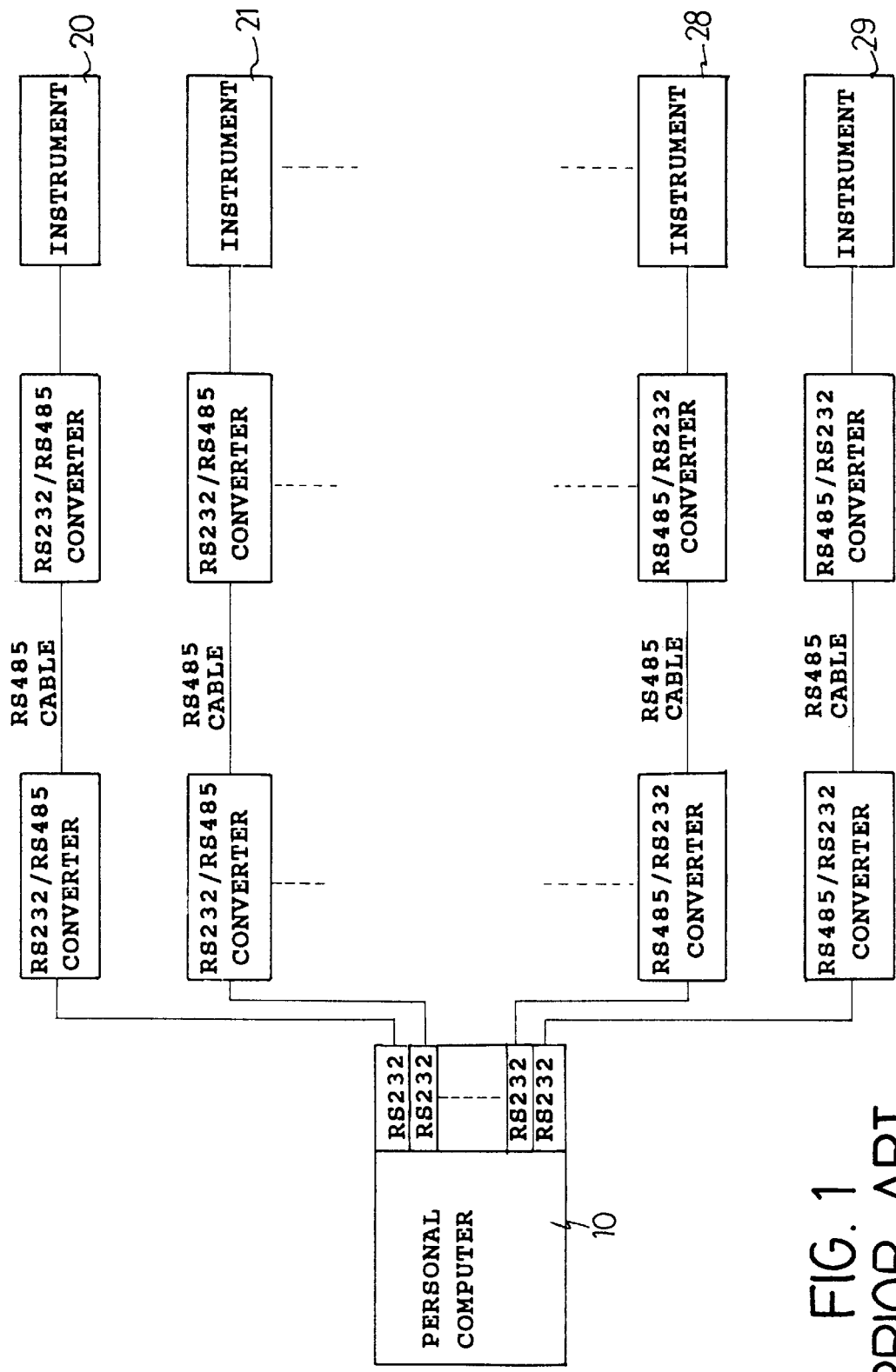
FIG. 1 is a block diagram showing a conventional connection arrangement of a personal computer and a plurality of instruments.

Referring to FIG. 1, a block diagram of a conventional connection between a personal computer (PC) and a plurality of instruments is shown. In order to have a PC 10 effectively used, the PC 10 is connected to ten remotely-located instruments 20–29 for example. Each of the connection paths between the PC 10 and instruments 20–29 includes an RS232 interface port located in the PC 10, an RS232/RS485 converter, and an RS485/RS232 converter connected to a corresponding instrument. In such an arrangement, the total devices required will be ten RS232 interface ports, twenty converters, and twenty RS485 cables, this will additionally increase the complexity of the interconnection therebetween and thus increase the costs for the connection.

Figure 2:
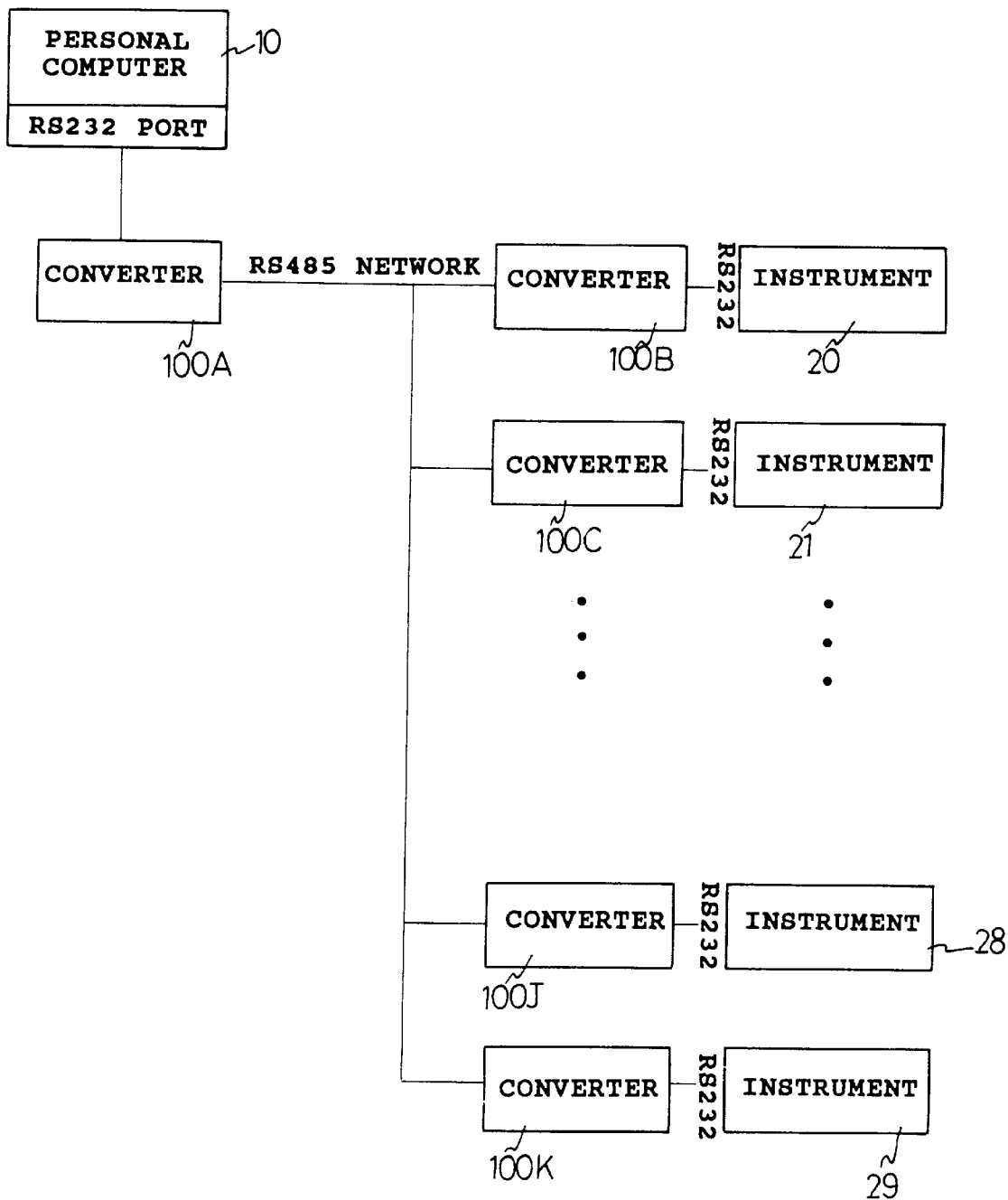
FIG. 2 is a block diagram showing a connection arrangement of a personal computer and a plurality of instruments according to the present invention.

A block diagram showing a plurality of converters 100A–100K of the present invention for connecting a PC 10 with ten instruments 20–29 is illustrated in FIG. 2. As shown, the PC 10 has an RS232 interface port connected to a converter 100A, ten converters 100B–100K are each respectively connected to a corresponding instrument 20–29 having an RS232 interface port, and an RS485 network is coupled between the converter 100A and the converters 100B–100K.

When it is intended to use the PC 10 to control one of the instruments, the PC 10 outputs an RS232 format signal having an address field and a control data to the converter 100A, which then converts the RS232 format signal into an RS485 format signal for remote transmission. The RS485 format signal is then received by all of the converters 100B–100K. If the address data of the received signal complies with a predetermined address value of a corresponding converter among the converters 100B–100K, then the control data within the received signal will be converted into a corresponding RS232 format signal having a predetermined transmission rate corresponding to the transmission rate that the corresponding instrument has. The remaining converters, which do not have an address value corresponding to the address data within the RS485 format signal, will not respond to the RS485 format signal.

Figure 3:
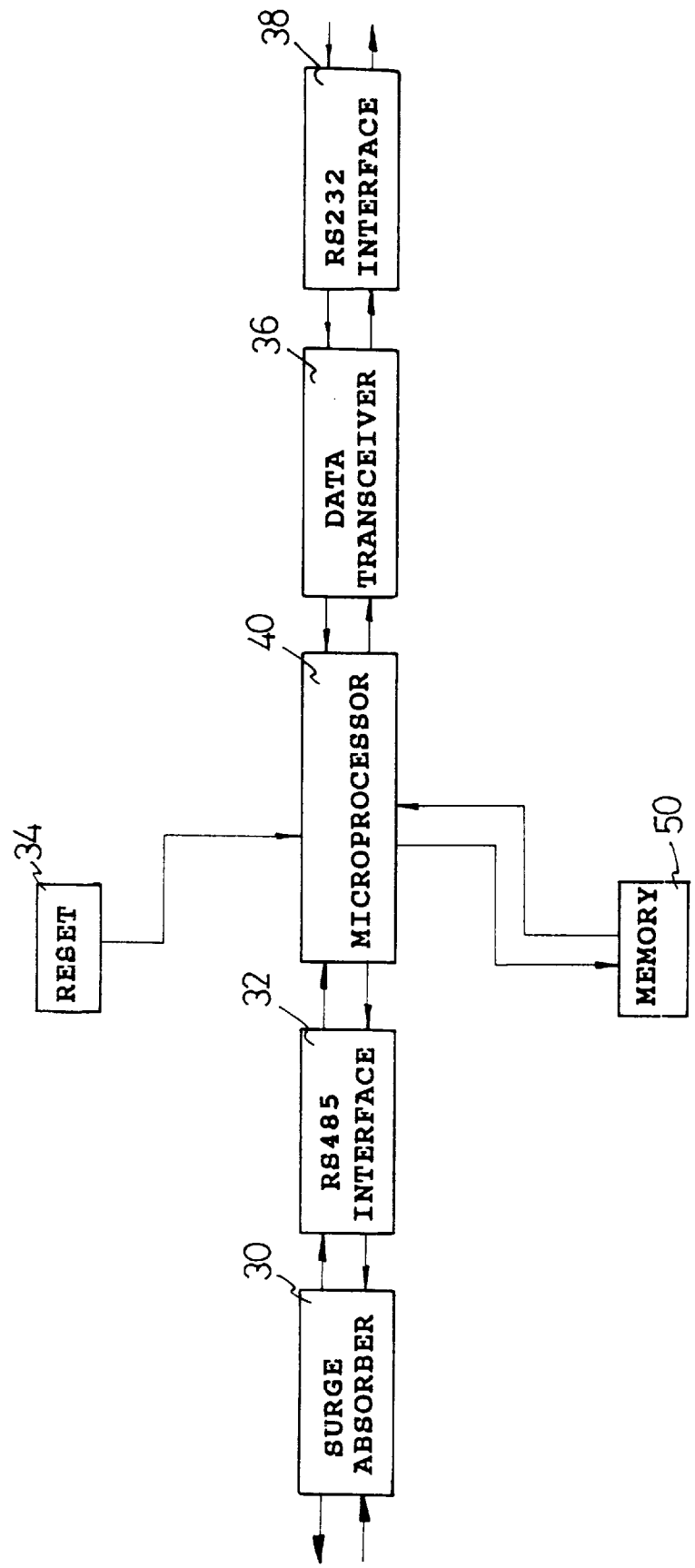
FIG. 3 is a block diagram of a transmission converter in accordance with the present invention.

Referring to FIG. 3, each of the converters 100A–K according to the present invention includes a surge absorber 30, an RS485 interface 32, a reset circuit 34, a data transceiver 36, an RS232 interface 38, a microprocessor 40, and a memory 50. The memory 50 is preferably an electrically erasable programmable read only memory (EEPROM) while the data transceiver 36 is a universal asynchronous receiver/transmitter (UART). As shown in FIG. 3, the surge absorber 30, the RS485 interface 32, the microprocessor 40, the data transceiver 36, and the RS232 interface 38 are connected in a sequential order. The reset circuit 34 and the memory 50 are respectively connected to the microprocessor 40 such that the reset circuit 34 may be used to reset the status of the microprocessor 40 and the memory 50. The memory 50 is used for storing address data for a corresponding instrument and a corresponding RS232 transmission rate for the corresponding instrument. The converter 100A–100K operates in a half duplex transmission mode and the microprocessor 40 may automatically control the transmission direction therebetween, i.e. the converters 100A–100K may convert signals between an RS232 format and an RS485 format.

Figure 4A:
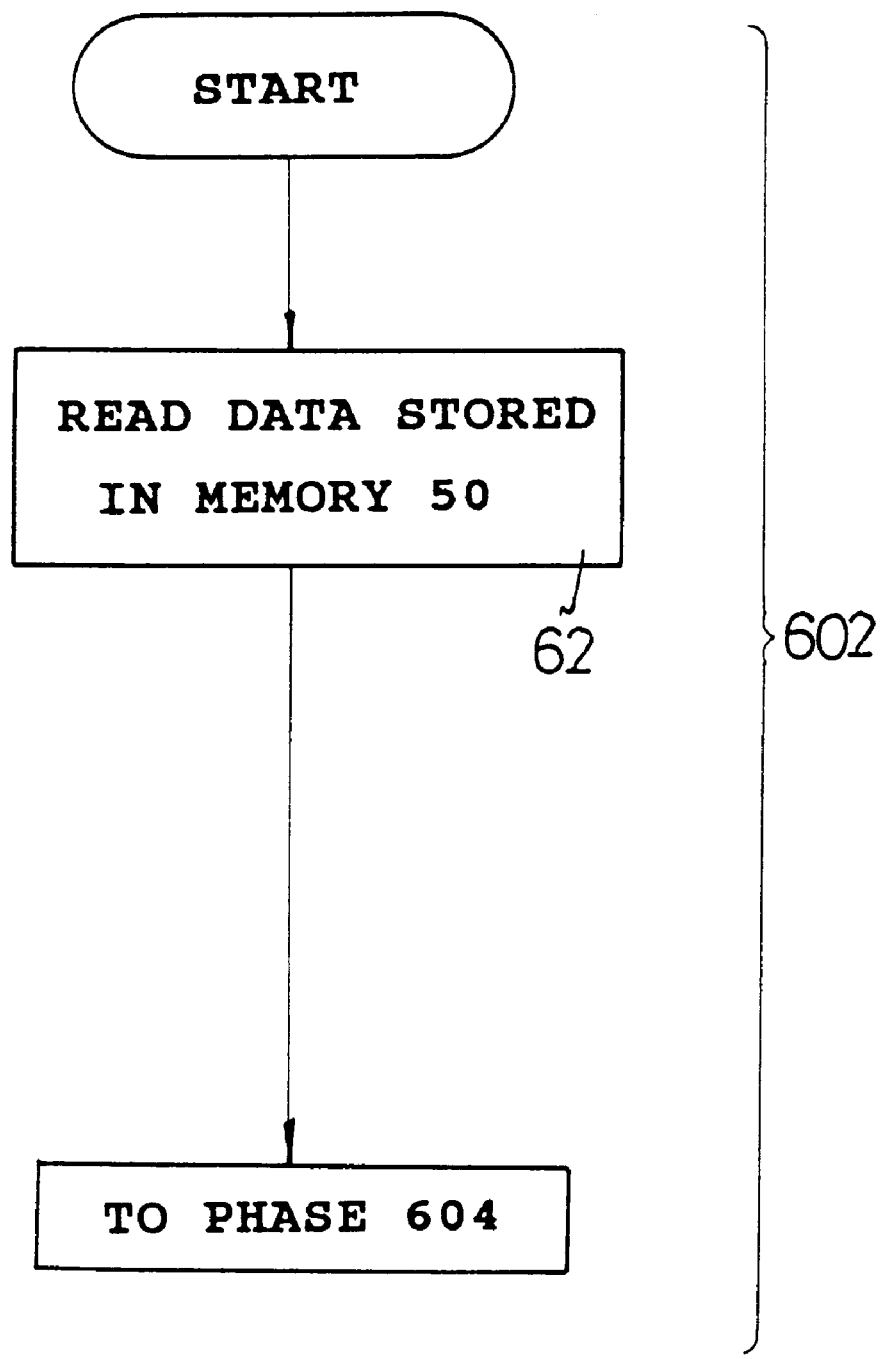
FIGS. 4A & 4B are flow charts showing a preferred method in accordance with the present invention.
Figure 4B:
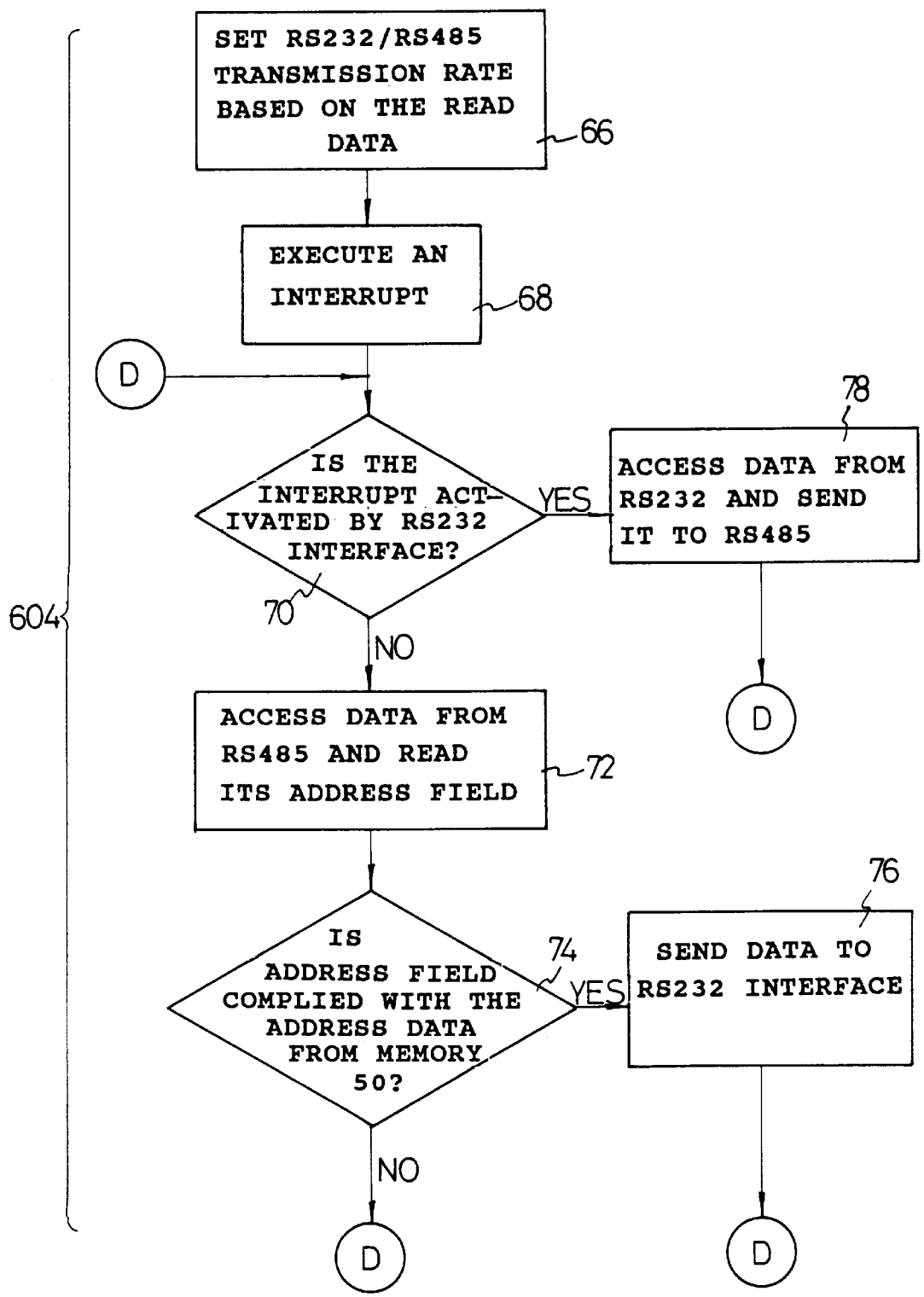

FIGS. 4A and 4B are flow charts of a preferred method that are operated by the microprocessor 40 of the present invention. The method comprises an initialization phase 602 and an addressed operation phase 604. The following description is described in reference to FIGS. 3 and 4A–4B. The initialization phase 602 begins by having the microprocessor 40 read the data pre-stored in the memory 50 (step 62). The addressed operation phase 604 is then performed. The microprocessor 40 will set the RS232 /RS485 transmission rate based on the read data (step 66), when an information signal either from the PC or one of the instruments 20–29 is transmitted into the microprocessor 40 via the RS232 or RS485 interface, the microprocessor 40 will execute an interrupt operation (step 68). The microprocessor 40 then determines whether the interrupt operation is activated by the RS232 interface or not (step 70). If the interrupt operation is not activated by the RS232, the microprocessor 40 will access the data from RS485 and read its address field (step 72). The microprocessor 40 will judge if the address field meets with the address code from the memory 50 (step 74), if the address field meets with the address code from the memory 50, then the data is sent to RS232 interface (step 76) and returns to step 70. If the address field does not meet with the address data from the memory 50 then it returns to step 70. If the interrupt operation is activated by the RS232 interface, the microprocessor 40 will access the data from the RS232 interface and send it to the RS485 interface (step 78) and then return to step 70.

In the above configuration, the PC 10 and the instruments are communicated in a half duplex mode, the PC 10 will not further require to control the transmission direction therebetween. Further, the RS485 interface mentioned can also be replaced by an RS422 interface or a combination thereof to switch to a desired transmission mode.

While the present invention has been explained in relation to its preferred embodiment, is to be understood that various modifications thereof will be apparent to those skilled in the art upon reading this specification. Therefore, it is to be understood that this invention disclosed herein is intended to cover all such modifications as fall within the scope of the appended claims.

I claim:

1. A communication system for communicating between a personal computer and a plurality of instruments, comprising:

master data transmission converter means coupled to the personal computer and adapted to communicate with an RS232 port of the personal computer; and a plurality of branch data transmission converters, each of said plurality of branch data converters including an RS485 interface, a microprocessor coupled to said RS485 interface, a memory coupled to said microprocessor for storing a unique individual identity address code therein, and an RS232 interface coupled to said microprocessor, said RS485 interface being coupled to said master data transmission converter means, said RS232 interface being coupled to a respective one of the plurality of instruments, said unique individual identity address code providing a single communication path being built between said master data transmission converter means and a branch data transmission converter which has been addressed by an information signal from the personal computer via the master data transmission converter means, said microprocessor accessing data in a direction of one of said RS485 interface and said RS232 interface responsive to an interrupt activated thereby.

2. The communication system as claimed in claim 1, wherein said memory of each of said plurality of branch data transmission converters further stores data corresponding to a transmission rate of a related one of the plurality of instruments.

3. A data transmission converter for coupling between an RS232 port and an RS485 port, comprising:

an RS232 interface coupled to the RS232 port;

an RS485 interface coupled to the RS485 port;

a data transceiver coupled to said RS232 interface;

a microprocessor coupled between said RS485 interface and said data transceiver; and a memory coupled to the microprocessor for storing an identity address code related to data transmission converter, said microprocessor enabling communication between the RS232 port and the RS485 port in a direction responsive to an interrupt being activated by one of said RS232 interface and said RS485 interface.

4. A method for communicating between a personal computer coupled with a master data transmission converter and a plurality of instruments each coupled with a branch data transmission converter, each of the data transmission converters having an RS232 interface, a microprocessor, a transceiver, an RS485 interface sequentially connected, and a memory connected to the microprocessor for storing an identity address code and a transmission rate data, comprising the steps of:

a) reading the identity address code and the transmission rate data and setting a corresponding transmission rate of the RS232 based on the read transmission rate data;

b) receiving an information signal from the RS232 interface or the RS485 interface and executing an interrupt operation;

c) determining whether the RS232 interface activates the interrupt operation or not;

d) if yes, then accessing the information signal from the RS232 interface and sending it to the RS485 interface;

e) if not, then reading the information signal from the RS485 interface; and f) accessing the information signal from the RS485 interface and sending it to the RS232 interface.

* * * * *